United States Patent [19]

Yializis et al.

[11] Patent Number: 5,731,948
[45] Date of Patent: Mar. 24, 1998

[54] HIGH ENERGY DENSITY CAPACITOR

[75] Inventors: Angelo Yializis; Theodore A. Miller, both of Tucson, Ariz.

[73] Assignee: Sigma Labs Inc., Tucson, Ariz.

[21] Appl. No.: 627,572

[22] Filed: Apr. 4, 1996

[51] Int. Cl.⁶ .................. H01G 4/015; H01G 4/018; H01G 4/06
[52] U.S. Cl. .................. 361/313; 361/273; 361/315; 361/326; 361/323
[58] Field of Search .................. 361/273, 279, 361/299.1, 272, 301.1, 305, 306.3, 311, 312, 313, 314, 315, 321.1, 321.2, 321.3, 321.4, 321.5, 322, 323, 326, 328; 118/730, 718, 719, 720

[56] References Cited

U.S. PATENT DOCUMENTS

| | | | |
|---|---|---|---|
| 4,490,774 | 12/1984 | Olson et al. | 361/311 |
| 4,499,520 | 2/1985 | Cichanowski | 361/311 |
| 4,513,349 | 4/1985 | Olson et al. | 361/311 |
| 4,515,931 | 5/1985 | Olson et al. | 526/323 |
| 4,533,710 | 8/1985 | Olson et al. | 526/323 |
| 4,842,893 | 6/1989 | Yializis et al. | 427/44 |
| 5,018,048 | 5/1991 | Shaw et al. | 361/323 |
| 5,032,461 | 7/1991 | Shaw et al. | 428/461 |
| 5,097,800 | 3/1992 | Shaw et al. | 551/645 |

*Primary Examiner*—Leo P. Picard
*Assistant Examiner*—Anthony Dinkins
*Attorney, Agent, or Firm*—Benman & Collins

[57] ABSTRACT

A high energy density, high power density capacitor having an energy density of at least about 0.5 J/cm³ is provided. The capacitor comprises a plurality of interleaved metal electrode layers separated by a polymer layer. The interleaved metal electrode layers terminate at opposite ends in a solder termination strip. The high energy density aspect of the capacitors of the invention is achieved by at least one of the following features: (a) the dielectric thickness between the interleaved metal electrode layers is a maximum of about 5 μm; (b) the polymer is designed with a high dielectric constant κ of at least about 3.5; (c) the metal electrode layers within the polymer layer are recessed along edges orthogonal to the solder termination strips to prevent arcing between the metal electrode layers at the edges; and (d) the resistivity of the metal electrode layers is within the range of about 10 to 500 ohms per square, or a corresponding thickness of about 200 to 30 Å.

12 Claims, 3 Drawing Sheets

HIGH ENERGY DENSITY CAPACITOR

TECHNICAL FIELD

The present invention relates generally to thin film capacitors, and, more particularly, monolithic multilayer, capacitors comprised of repeated layers of polymer dielectric and alternating metal electrodes. The polymer/metal multilayer is built up using a high speed vacuum deposition method according to which successive layers of radiation cured polymer dielectric and metal evaporated electrodes are deposited in a vacuum environment using a continuous and sequential deposition process.

BACKGROUND ART

Metallized film capacitors are used extensively in a broad range of electrical and electronic equipment that include motor run and motor start circuits for air conditioners, fluorescent and high intensity light ballasts, power supplies, telecommunication equipment, instrumentation, and medical electronics. In many of these applications, the metallized capacitors are used to conserve energy by correcting the power factor of a circuit and in others they are used to perform specific functions, such as timing, filtering, and decoupling. The advantages of monolithic multilayer over film foil or metallized film capacitors include lower volume, weight, cost, and higher application temperature.

High energy density capacitors that are based on polymer dielectrics are usually designed with foil electrodes and a composite insulation system that consists of polymer film, or possibly paper and a liquid impregnant. Lower voltage applications include metallized film designs which can be dry or liquid impregnated. These capacitors serve various pulsed power applications that are differentiated by the repetition rate and the dV/dt of the charge and discharge pulses. Low repetition rate applications include flashlamps, copiers, defibrillators, pulsed lasers and more recently beam weapons and electromagnetic catapults. High repetition rate conditions are common to short pulse radar modulators, isotope separation lasers, directed energy weapons and electronic warfare and countermeasure pulse generators.

When designing high energy density capacitors with materials such as polypropylene (PP), polyester (PE), polycarbonate (PC), polyvinylidene fluoride (PVDF), and paper, the limitations that the person skilled in the art is faced with when attempting to increase the energy density include:

Little or no variation in the dielectric constant and breakdown voltages due to fixed polymer chemistries;

Rapid degradation of the dielectrics when the voltage of the capacitor is raised above the corona inception voltage;

Loss of dielectric constant (PVDF film) when exposed to higher voltages;

Dielectric degradation by thermal loads and electrostrictive forces in high dV/dt and high rep-rate pulse applications; and Dielectric thickness limitations due to mechanical strength of the self supported film.

In order to make a significant improvement in the energy density of these capacitor systems, new films are required with high dielectric constants that are also stable at high temperatures and voltages.

Acrylate monomer films are presently formed in the vacuum with a continuous ultra high-speed deposition process and they are cross-linked using electron radiation; see, e.g., U.S. Pat. Nos. 5,018,048 and 5,097,800. These films have excellent thermal and mechanical properties, and high-quality polymer monolithic (PML) chip capacitors with dielectric constant, κ, equal to 3.5 have been produced for electronic applications. These capacitors are limited to low voltage applications (<50V). Since the maximum capacitor energy density $D_m$ is equal to $$D_m = \tfrac{1}{2}\kappa e_o E_m^2 (J/cm^3) \tag{1}$$

where κ is the dielectric constant, $e_o$ is the permittivity of free space, and $E_m = V/t =$ maximum field, where V is the maximum applied voltage and t is the dielectric thickness, then the PML capacitors have limited energy density capabilities.

What is needed is a thin film capacitor that has a material with comparatively higher dielectric constant that can also withstand high applied voltages.

DISCLOSURE OF INVENTION

In accordance with the invention, a high energy density capacitor having an energy density of at least about 0.5 J/cm³ is provided. The capacitor comprises a plurality of interleaved, vacuum-deposited metal electrode layers separated by vacuum-deposited, radiation-cured polymer dielectric layers. The interleaved metal electrode layers terminate at opposite ends in a multilayer sputtered, solder-coated termination strip. The metal electrode layers are recessed into the polymer layers, thus creating a non-conducting region, to protect against arcing and leakage current between the metal electrode layers along the edges orthogonal to the solder terminations.

The high energy density aspect of the capacitors of the invention is achieved by at least one of the following features:

(a) the dielectric thickness between the interleaved metal electrode layers is a maximum of about 10 μm;

(b) the polymer is designed with a high dielectric constant, κ, where κ is higher than 3;

(c) the metal electrode layers within the polymer layer are recessed along edges orthogonal to the solder termination strips to prevent arcing between the metal electrode layers at the edges; and (d) the metal electrode resistance is within the range of about 10 to 500 ohm per square.

The increased dielectric constant can be obtained with a new family of dielectric materials made from radiation curable monomers. The dielectric materials can be produced by molecularly synthesizing multifunctional acrylated monomer materials that have a high degree of polar non-centrosymmetry. Polar functionalities are added to difunctional and trifunctional acrylate monomers that are then used to produce thin polymer films. Alternatively, monomers with smaller intrinsic dipoles can be used if, in the cross-linked polymer product, the dipoles have unusually high degrees of freedom in response to applied fields. The acrylate materials described in this disclosure have κ of greater than 3. Acrylate polymer materials have been formulated with dielectric constants at least as high as κ=10, and κ=10 to 15 to 20 can likely be achieved with continuing development. These acrylate polymer films can be thermally stable at temperatures in excess of 300° C., and can have a thickness that is at least as low as 0.1 μm and up to 10 μm.

Figure 1:
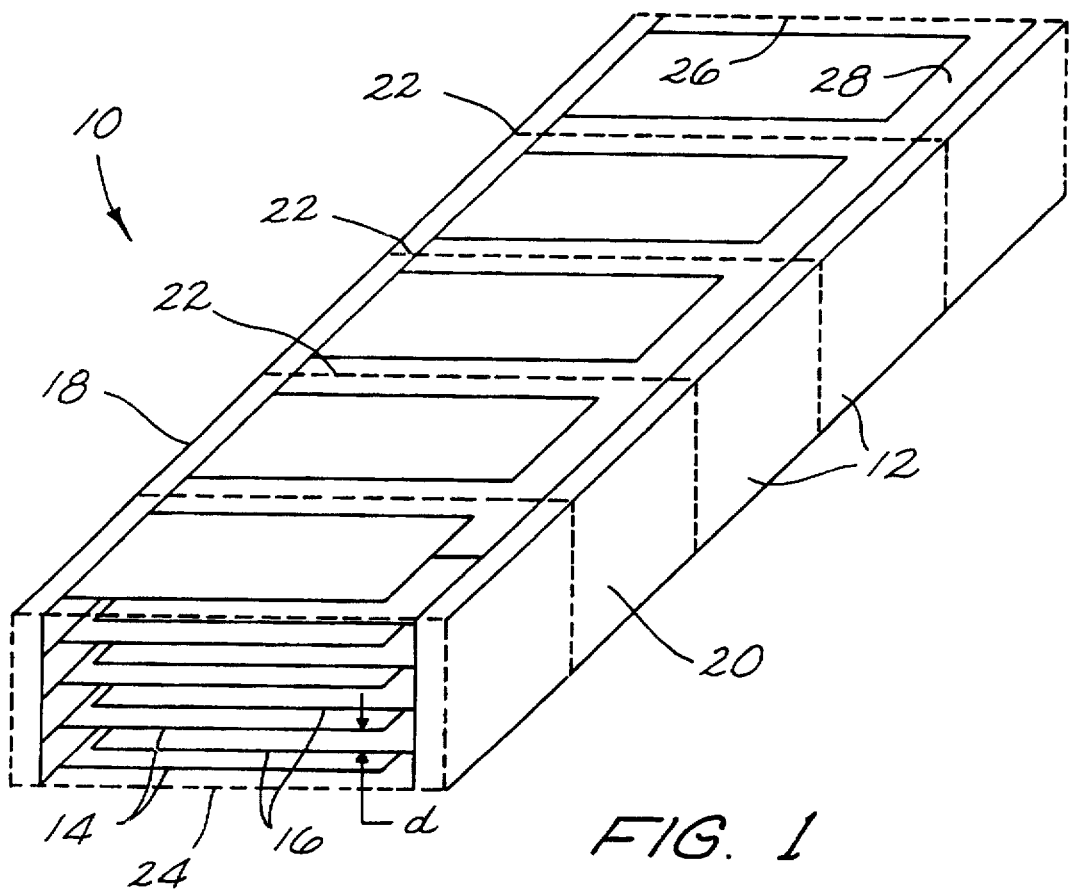
FIG. 1 is an enlarged view in perspective of a strip of a plurality of high energy density, polymer monolithic (PML)
Figure 2:
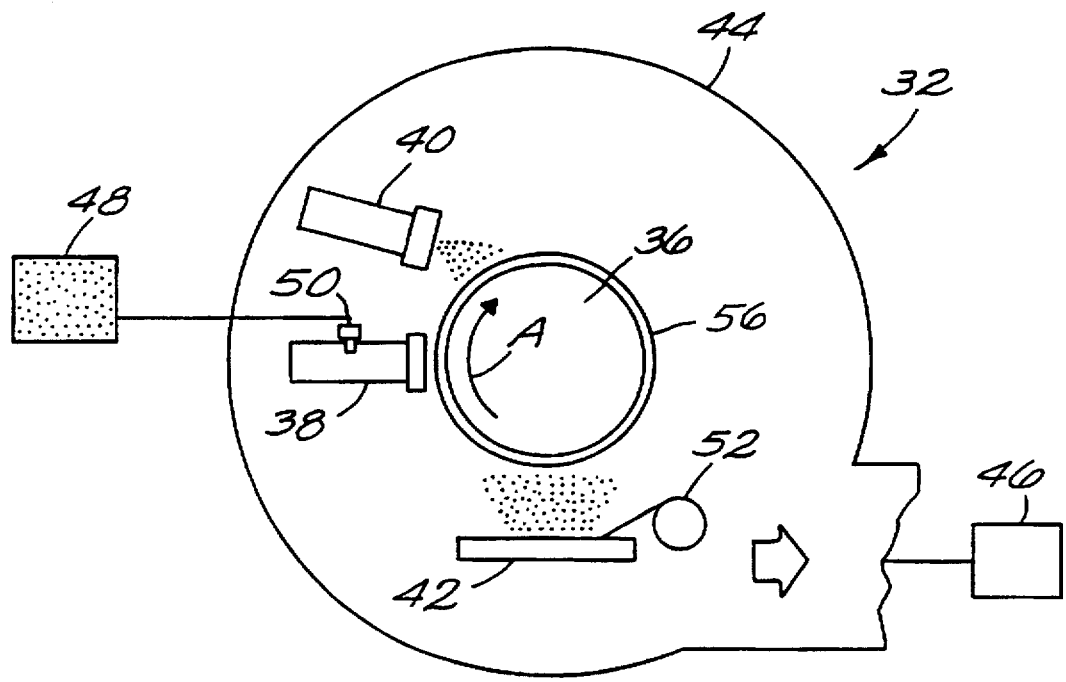
Figure 3:
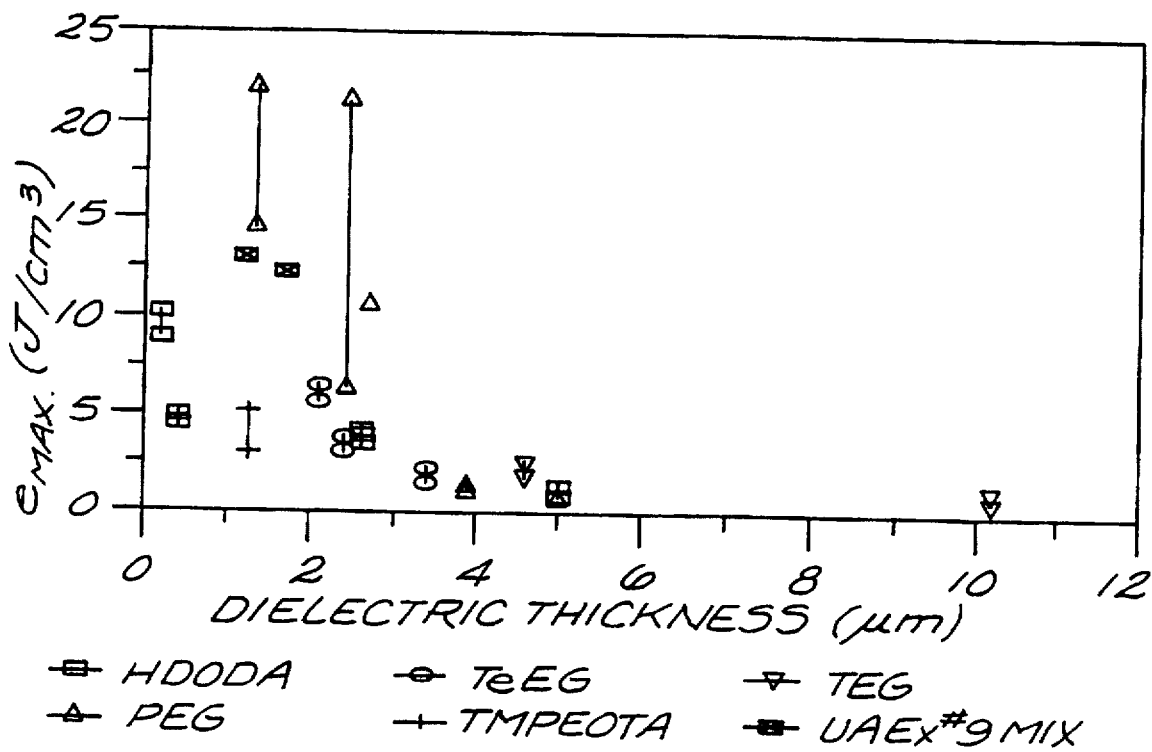
Figure 4:
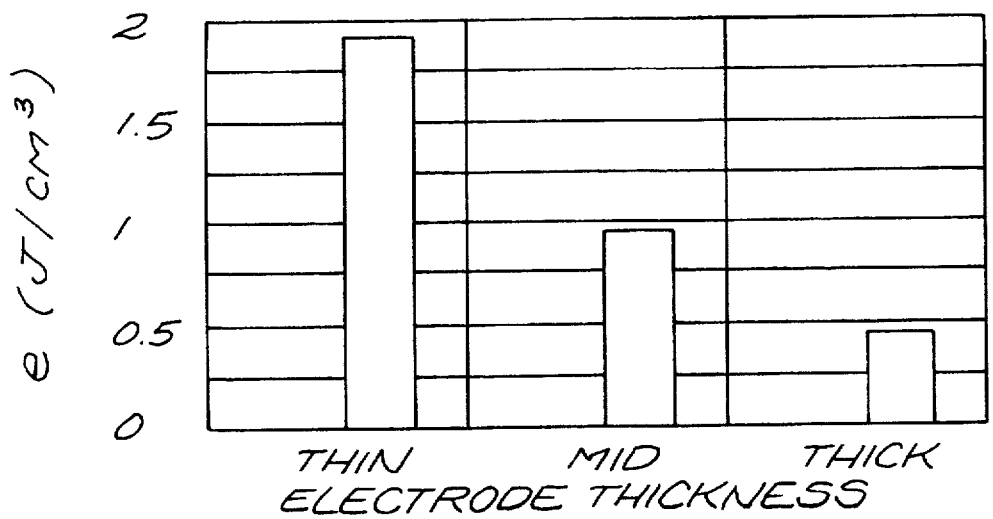
Figure 5:
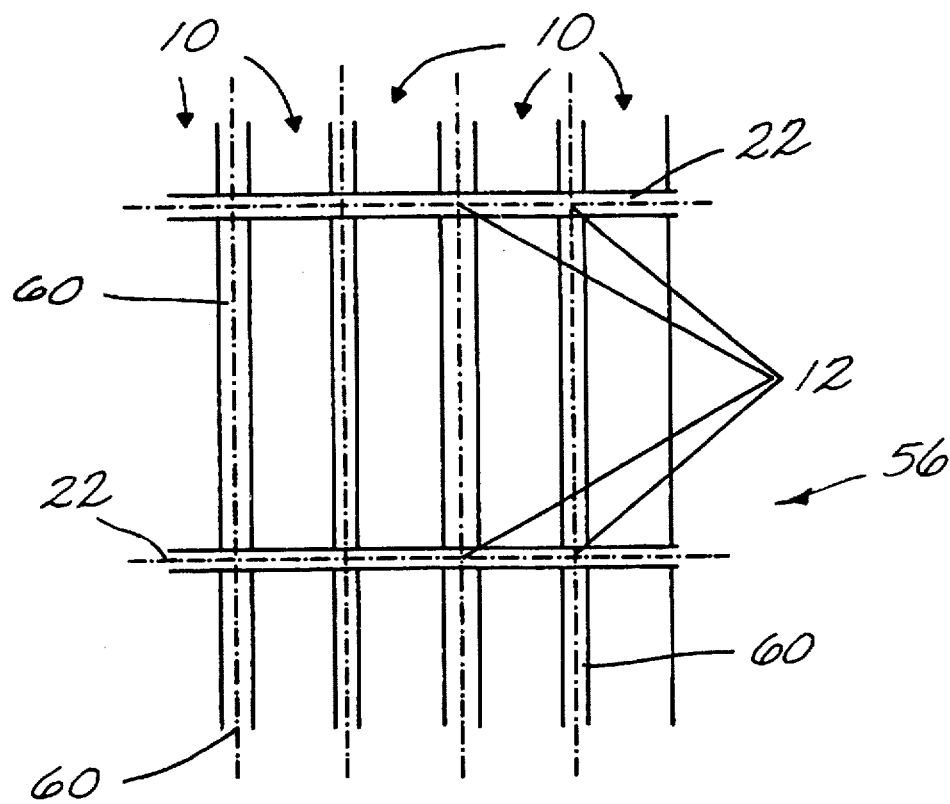
Figure 6A:
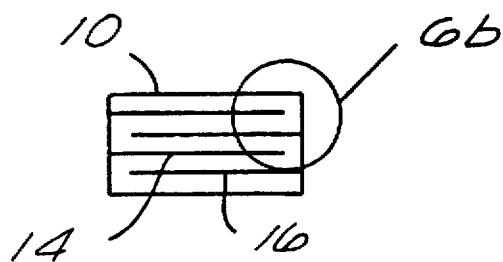

capacitors of the present invention, the strip having been cut from a two-dimensional array in which the capacitors are formed;

FIG. 2 is a schematic representation of high speed polymer deposition equipment, including a rotating drum, used to produce the PML capacitors of FIG. 1;

FIG. 3, on coordinates of energy density (in joules per cm$^3$) and dielectric thickness (in μm), is a plot of the maximum energy density for six different dielectric materials;

FIG. 4, on coordinates of energy density (in joules per cm$^3$) and electrode thickness (relative), is a plot of the observed energy density for capacitors of the present invention having different electrode thicknesses;

FIG. 5 is a schematic representation, in top plan view, of multiple PML capacitor strips that are produced by the multi-layer PML process of the invention;

FIG. 6a is side elevational view of the capacitor strip shown in FIG. 1; and

Figure 6B:
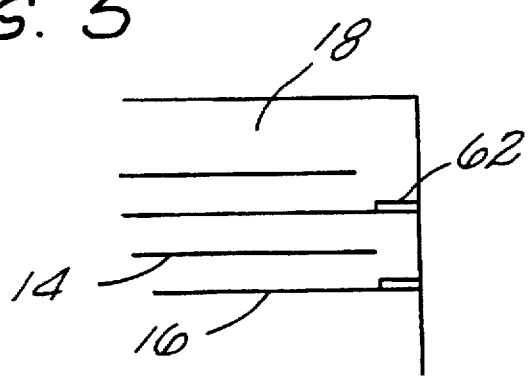

FIG. 6b is an enlargement of a portion of FIG. 6a.

BEST MODES FOR CARRYING OUT THE INVENTION

A. Fundamental Considerations

The high energy density capacitor design of the present invention maximizes both κ and E in Equation (1). The dielectric constant κ is maximized by designing and synthesizing monomers tailored specifically to yield high dielectric constants. Monomers with dielectric constants up to 10 have been synthesized and tested, but it is expected that by use of the teachings herein, new monomers will be synthesized that yield dielectric constants above 10.

Because of the quadratic dependence of D on E, optimizing the maximum applied field has a greater effect than optimizing the dielectric constant. $E_m$ can be maximized by tailoring the polymer dielectric, by minimizing the thickness of the dielectric layer, and by limiting exposed edge breakdown. The PML technology is capable of producing ultra-thin polymer layers at an extremely high rate so that production speed is not compromised. The ultra-thin geometry maximizes the breakdown strength of the dielectric to its fullest potential, as discussed in detail below.

B. Capacitor Configuration and Fabrication

Referring now to the drawings wherein like numerals denote like elements throughout, FIG. 1 shows a capacitor strip 10 comprising a plurality of capacitors 12, cut from a larger two-dimensional capacitor array (a top plan view of the array is shown in FIG. 5 and described in greater detail below). Each capacitor 12 comprises two sets of interleaved electrodes 14, 16, separated by a dielectric 28. Each set of electrodes 14, 16 terminates in a common solder termination strip 18, 20, respectively, for connection into an electrical circuit (not shown). The capacitor strip 10 is cut into the plurality of capacitors 12 along lines 22, which are seen to be made through the dielectric 28 only.

The electrodes 14, 16 are separated by a distance d (thickness of the dielectric layer between the electrodes), typically within the range of about 0.05 to 5 μm, although the distance may be smaller or larger, depending on the particular design of the capacitor 12. The electrodes 14, 16 may comprise any of the metals commonly employed in capacitor design; however, since aluminum is generally used, it is preferred. Each metal layer is terminated and electrically connected by the solder strips 18, 20.

The polymer dielectric comprises a cured polymer, i.e., radiation-curable resin, capable of adhering or bonding to the electrode material. Useful resins are polyfunctional acrylics, and mixtures thereof, such as disclosed in U.S. Pat. Nos. 4,499,520; 4,490,774; 4,533,710; 4,513,349; and 4,515,931. Specific polyfunctional acrylic dielectric materials are well-known and these do not form a part of the present invention.

As will be apparent from the dimensions given, even a miniature capacitor of this design which is less than 1 inch square in the outer periphery and a few millimeters thick can embody many alternate electrode 14, 16 and dielectric 28 layers, up to 1,000 or more. The result is a capacitor that is effective at up to 1000 Volts (V) with a capacitance in the 1 nanoFarad (nF) to 1 farad (F) range, depending, of course, upon overall size and the number of electrode pairs.

The dielectric coatings 28 space and separate the conductive layers 14, 16 which, as described above, are uniformly interleaved in stacked electrically isolated relation. The fabrication of the thin film capacitor 12 is described elsewhere; see, e.g., U.S. Pat. Nos. 5,018,048, and 5,097,800. Briefly, capacitors 12 are simultaneously formed in large numbers by depositing electrode material 14, 16 and dielectric 28 in strips on the surface of a rotating drum 36 (seen in FIG. 2), which rapidly moves relative to the depositing systems, described below.

The conductive layers 14, 16 and dielectric coatings 28 are built up in the number desired by causing successive passes to be made relative to the depositing systems, thereby forming the two-dimensional array of capacitors. After slicing to form capacitor strips 10, the solder termination strips 18, 20 are then formed to terminate and short the conductive layers 14, 16, respectively. The capacitor strips are then sliced along the lines 22 into individual capacitors 12, leads (not shown) are added to the solder termination strips 18, 20, and the device 12 is encapsulated.

During the former slicing operation, exposed edges 24, 26 are formed, which are orthogonal to the solder termination strips 18, 20. Both the conductive layers 14, 16 and dielectric coating 28 are exposed. One factor limiting the breakdown voltage is believed to be caused by the presence of the exposed edges 24, 26. Specifically, breakdown arcs occur more readily (at lower fields) along surfaces and interfaces. Breakdown through bulk (solid) material and breakdown through an air gap is more difficult than breakdown along a solid/gas interface. As described in greater detail below, the breakdown along the exposed edges 24, 26 is reduced by recessing the conductive layers 16, 18 back from the exposed edges of the dielectric 28.

The polymer deposition process is shown schematically in FIG. 2, employing apparatus 32 as an example. Briefly, the process starts by depositing a reactive acrylate monomer film onto the surface of a rotating drum 36, after application of a suitable thin release coating (not shown). Liquid monomer material is pumped from a reservoir 48, through an ultrasonic atomizer 50, into a heated evaporator 38, where the droplets of monomer are heated and converted into vapor that condenses onto the drum 36, to form a thin monomer film. The monomer film moves under an electron beam generated by an electron gun 40 where it is cross-linked to form the dielectric coatings 28. The metal layers 14, 16 are deposited on the cross-linked film 28 from a metal evaporator 42 fed by source 52, as described in the patents referenced above; the metal layers are interleaved with the cross-linked film as shown in FIG. 1.

As the drum 36 rotates, successive polymer/metal bilayers are deposited on each revolution, ultimately forming capacitor "straps" 56, described in greater detail below with reference to FIG. 5. The drum 36 can rotate at surface speeds as high as 1000 ft/min, that can lead to the formation of multilayer structures with thousands of layers in a time interval of less than 1 hour. Since there are no known limitations on the size of the metal evaporator 42 and the electron gun 40, depending on the specific application, the drum 36 can be sized to accommodate multilayer coatings that are several feet wide by at least 10 to 15 feet long.

The apparatus 32 includes a vacuum chamber 44 is connected to a vacuum pump 46, which evacuates the chamber to the appropriate pressure. The vacuum employed in the practice of the invention is less than about 0.001 atmospheres, or less than about 1 millibar. Typically, the vacuum is on the order of $1 \times 10^{-4}$ Torr ($1.3 \times 10^{-4}$ millibars).

The specific aspects of the process are described in greater detail in U.S. Pat. Nos. 4,842,893 and 5,032,461, and do not form a part of the present invention.

C. Ultra-Thin Dielectric Layers

Because of the dynamic nature of breakdown phenomena, Equation 1 does not describe the intrinsic properties of a dielectric material. The maximum energy density, $D_m$, is not only a function of the material composition, but it is also a function of the geometry utilized in the capacitor. In particular, the breakdown field is much larger for extremely thin dielectric layers.

Although there are a variety of bulk breakdown mechanisms (any or all of which can contribute to breakdown), an important breakdown initiator is the avalanche mechanism. An electrical avalanche occurs when an electron is displaced from its localized potential well under the influence of thermal excitations and the applied electric field. Accelerating under the influence of the field, it collides with other atoms and electrons and generates more free electrons. The additional free electrons in turn are accelerated, collide and provide still more electrons. When this localized stream of electrons becomes energetic enough, it causes local heating and burning of the dielectric. At this critical power level, $p_c$, the released combustion gases convert to form the extremely low resistance plasma path in the electrical spark of the breakdown.

The occurrence of breakdown depends on the composition of the dielectric which affects the depth of the electron potential wells and the type of gases produced upon heating and combusting. Other factors include the magnitude of the electric field and the separation of the two electrodes of the capacitor. If the electrodes are far enough apart, the electron avalanche has enough distance to build up local heating and induce plasma-related breakdown. The closer the electrodes are to each other, the greater the electric field required to build-up the electron avalanche to the critical level.

If the avalanche mechanism is the only breakdown mechanism, an inverse exponential dependence on electrode thickness is expected. The exponential dependence comes from the expectation that the change in current (dj) as a function of position between the electrodes (dx) will be proportional to the current j at that point:

$$\frac{dj}{dx} = kj \quad (2)$$

or $$j \propto e^{kx}. \quad (3)$$

where k is a constant. If the critical power density at which gaseous combustion products or vaporization products form (enabling the formation of low-resistance plasma) is designated as $p_c$, then it can be shown that the breakdown field, $E_b$, depends on distance as $$E_b = \frac{p_c}{j} \propto e^{-kx}. \quad (4)$$

This simplified theory in Equation 4 ignores material properties such as potential well depths, ionization potential of the liberated gases, diffusional broadening of the avalanche as it traverses the dielectric, and probably other phenomena as well, but it serves to justify the concept of dramatically increasing breakdown fields with decreasing layer thickness.

There are several dielectric materials (primarily based on acrylated monomers) that are compatible with the PML processing and that yield high-energy densities. FIG. 3 illustrates the results of a set of experiments on single layer capacitors that demonstrate the advantages of working with thin layers. In this experiment, a polymer substrate was initially patterned with aluminum electrodes. A monomer was deposited over the electrodes and cured using the PML process described above. A set of second electrodes was deposited over the polymer layer yielding a set of 24 single layer capacitor samples.

These samples were evaluated for breakdown field by monitoring the capacitance after applying a set of increasing voltages. The maximum energy density, $D_m$, results from a set of six acrylated monomer compositions are shown in FIG. 3. These results indicate that energy densities from 10 to 20 J/cm$^3$ have been experimentally verified. It also indicates that for every material, the results improve dramatically as the thickness of the dielectric layer is reduced. There are at least four materials that exceed 3 J/cm$^3$, which is the state of the art in commercial, polymer dielectric, electrostatic capacitors.

Table I below sets forth the key for the materials shown in FIG. 3 and their dielectric constant:

TABLE I

DESIGNATION OF MATERIALS DEPICTED IN FIG. 4.

| Designation | Material | Dielectric Constant |
|---|---|---|
| HDODA | hexadiol diacrylate | 3.8 |
| TEG | triethylene glycol diacrylate | 6.5 |
| TMPEOTA | trimethylol propane ethoxy triacrylate | 4.1 |
| TeEg | tetraethylene glycol diacrylate | 7.0 |
| PEG | polyethylene glycol diacrylate | 6.9 |
| #9 mix | cyano multifunctional acrylate | 10.5 |

Since these experiments were performed for purposes other than measuring $D_m$, the effects of minimizing the dielectric thickness was not fully explored. However, some energy density extrapolations based on two facts apparent in FIG. 3 can be made.

First, these extrapolations are based on the fact that energy density increases sharply for thinner dielectrics. For example, HDODA in FIG. 3 doubles in energy density when the thickness is reduced from approximately 0.4 μm to 0.2 μm. PEG in FIG. 3 has an energy density that increases by a factor of 10 as the thickness is reduced from 3.9 μm to 0.6 μm.

Second, the performance of the materials is relatively constant in comparison to one another. If a material has a higher energy density than another at one thickness, it tends to have a higher energy density at all thicknesses. This fact is expected to hold as long as the principle breakdown mechanism remains the same at all thicknesses considered.

The PML processing described above can routinely produce 0.1 μm thick layers. In order to predict the limits of the PML product, the performance can be extrapolated to that thickness. For example, TEG had an excellent $D_m$ at approximately 4.3 µm, but there were no thinner samples evaluated. If, as expected, the foregoing extrapolations hold for this dielectric material, the energy density will certainly increase to more than 20 J/cm$^3$. In fact, if the energy density increases by a factor of 10 as it does for PEG, the energy density could approach 40 J/cm$^3$ at a dielectric thickness of approximately 0.5 µm and possibly more for 0.2 µm.

The PML capacitors have also low equivalent series resistance and consequently have a high power density. Unlike chemical double layer supercapacitors, there is no physical transport of ions or any charged species. Furthermore, internal resistance and inductance are kept very low by the highly parallel layered design.

Since the energy density depends on the square of the field, $E_b$ is more important than κ, as is evident from FIG. 3. The dielectric constants set forth in Table I above were used in constructing the plots of FIG. 3. The benefits of thinner dielectrics are particularly evident in FIG. 3, with the higher energy densities allowed with thinner dielectric layers.

Consistent with the foregoing considerations, the thickness of the dielectric layer 28 is preferably within the range of about 0.05 to 10 µm and most preferably within the range of about 0.05 to 2 µm. Further, the high energy density capacitor of the present invention could have a lower κ, so long as it has thin dielectric layers of thickness less than about 1 µm.

D. Thin Metal Electrodes

The aluminum electrodes 16, 18 are about 30 to 200 angstroms (Å) thick and have a corresponding resistivity of 500 to 1 ohm/sq. This compares with prior art thin film metallized capacitors in which the thickness of the aluminum electrodes is in the range of about 200 to 500 Å.

The electrode resistivity has been found to have a major effect on the capacitor breakdown voltage. Over the past ten years, improved electrode corrosion resistance has allowed electrode resistivities in AC capacitors to increase from about 2 to 3 ohm/sq to about 5 to 9 ohm/sq. This has led to energy density increases of about 50 to 80% in high volume motor run, motor start, and lighting ballast capacitors.

In one preferred embodiment, the metal electrode film resistance is about 1 ohm per square near the termination strips 18, 20 to allow for good electrical contact and low contact resistance and is in the range of about 10 to 500 ohm per square away from the termination strip and in the active capacitor region to facilitate self-healing if a breakdown occurs in any dielectric layer 28.

Metallized PET film capacitors with ultra thin active area electrodes (about 120 ohm/sq) for a medical low voltage, high energy density application have been fabricated. The thin metallized electrodes have resulted in an increase of the operating stress of regular metallized PET film capacitors (having a resistivity of about 2 to 4 ohm/sq) from 200 VDC/2.5 µm-PET, 120 µF capacitors to 460 VDC/1.5 µm-PET, 120 µF. This represents an increase in energy density of 730%. Although the increase in the breakdown strength of the film appears to be very high, the value of 460 V/1.5 µm is about the same as that of plain PET placed between two foil electrodes. This clearly demonstrates the superior self-healing ability of the ultra-thin metallized electrodes that can allow a metallized film to be stressed at the level of a liquid impregnated film/foil system.

The reason that the use of such thin electrodes is not widespread is due to a large extent of the inability of film metallized manufacturers to produce high ohm/sq electrodes repeatably. However, thin aluminum electrodes deposited on electron beam-cured acrylate polymers have been found to be corrosion stable and very reproducible. The acrylate polymers that are formed in the vacuum just prior to the metallization are free of components such as oxides, adsorbed water, and low molecular weight materials that are common in most polymer films and can lead to chemical and structural degradation of the thin aluminum electrodes.

The use of thin electrodes confers an additional benefit: the capacitors are self-healing at comparatively low energy. The energy E of a clearing in a capacitor is proportional to the following factors:

$$E \sim KV^4/\rho P,$$

where E is the energy of a clearing event (in Joules), V is the applied voltage (in volts), ρ is the electrode resistivity (in ohms/sq), and P is the interlayer pressure (in psi). The low clearing energy in capacitors employing the ultra-thin electrodes reduces the probability for a thermal runaway failure mode, which is common in metallized capacitors that are overvolted.

FIG. 4 depicts observed energy density values in three groups of capacitors that have been built side by side with identical dielectric layers, but with electrodes that have different resistivities (thickness). The electrode thickness values for "thick", "mid", and "thin" correspond to resistivities of 5 to 10 ohm/sq, 10 to 50 ohm/sq and 50 to 500 ohm/sq, respectively. A range of ohm/sq values is given because over several thousand capacitor layers, the resistance of the electrodes in a given capacitor may vary. Nonetheless, it is evident that reducing the electrode thickness results in an increase in energy density of the capacitor.

Metals other than aluminum may also be employed as metal electrodes; such metals comprise a high conductivity, low melting point material. In addition to aluminum, the metal electrodes may comprise zinc or zinc/aluminum alloys.

E. Protected Edge

It is desired to reduce or eliminate arcing between the metal electrode layers 14, 16 near the exposed edges 24, 26 in order to increase the breakdown strength. This is accomplished by recessed termination of the metal electrode layers 14, 16 within the polymer layer 18 along edges orthogonal to the solder termination strips 18, 20. One way to recess the metal electrode layers 14, 16 is to pattern the metal deposited so that metal is avoided near the exposed edges of the electrodes. Alternatively, recessing may be accomplished by oxidizing those portions of the metal electrode layers 14, 16 in the selected areas to form non-conducting oxides.

There are a variety of ways to pattern the metal, including removal of the metal from selected areas (e.g., laser patterning) and masking (e.g., shadow mask, liquid print mask, vapor evaporation and liquid transfer mask, and vapor jet). These techniques, which are disclosed and claimed in copending U.S. application Ser. No. 08/628,030 [D-94092], filed on even date herewith, are briefly described below, and are suitable for the production of the PML capacitors of the present invention.

1. Laser Patterning

Laser ablation may be employed to remove metal from selected regions. For example, Nd:YAG lasers may be used to draw lines typically 0.1 to 1 mm wide. Laser power may range from 2 to 60 W.

The laser ablation methods have been tested using Nd:YAG lasers. At all laser powers tested, the top metal layer was completely ablated away. At higher laser power, the samples were ablated several layers deep. Under optical and SEM microscopy, channels cut in the multilayer using a high laser power were observed. The channels were approximately 0.5 mm wide, approximating the laser beam diameter. Close inspection revealed that the laser beam can demetallize the top metal layer and then pass through the polymer layer and demetallize the layer below. The energy created by the evaporation of the second layer causes the polymer layer ablate, thus creating a small hole. Depending on the laser power, this process can extend several or more layers into the multilayer stack.

At lower power, the top metal layer was completely removed. Under optical and SEM microscopy, there was observed a broad expanse of surface that had only one layer of metal removed, without removing any polymer layer. The expanse of demetallized polymer indicates a broad power density window that performs the metal removal without affecting the underlayers.

In one preferred embodiment, a portion of a metal electrode 14, 16 is removed in situ from the selected region by laser ablation, following deposition of that metal electrode and prior to deposition of the polymer dielectric layer 28 thereon.

2. Continuous Web Shadow Mask

The continuous web concept embodies a flexible mask (not shown) that is in contact with the deposition surface of the main drum 36 when the metal electrodes 14, 16 are deposited and is removed when the monomer layer is deposited and cured to form the dielectric 28. Holes cut into the flexible shadow mask allow metal patterns to be deposited through the mask onto the surface of the main drum 36. In one particular embodiment, the mask was a continuous loop of 10 mil polyester, 12 inches wide and about 14 feet long. Simple 1 inch×2 inch square holes were cut into the mask to provide a test deposition pattern. The existing web handling system is designed for a batch process with wind and rewind rolls rather than a continuous loop. Additional rollers were designed and installed to close the web loop and to appropriately tension the continuous loop web mask.

The shadow mask provides masking in the cross-machine direction (CMD). A separate metal mask provides masking in the machine direction, perpendicular to the CMD masking.

With reference to FIG. 5, one or more capacitor strips 10 are produced around the drum 36 in one run as part of a larger two-dimensional array. Two aluminum masks (not shown) are used. One mask moves from side-to-side and produces the heavy edge electrodes 62 (seen in FIG. 6b) and the "side margin" 60. The other mask moves in the direction of the drum 36 and it periodically shadows the capacitor strip 10 to produce the "end margin" 22. FIGS. 6a and 6b depict the side elevational view of the end of one such strap 10.

3. Liquid Print Masking

The liquid print masking technique utilizes the low sticking coefficient of metal atoms on a liquid surface. A thin film of liquid on a surface will minimize metal deposition. By patterning the thin liquid film, the metal deposition can be patterned. Three methods of applying the liquid film are described.

3a. Oil Liquid Print-Mask

The liquid is printed on the surface of the main drum using technology similar to conventional offset gravure printing. In one configuration of the system, a finely engraved anilox roller (not shown) picks up liquid from a pan (not shown). The liquid is metered by the doctor blade (not shown), which removes all the liquid that is not in the engraved grooves (not shown) in the anilox roller. The liquid is picked up from the anilox roller with a rubber transfer roller (not shown) that smoothes the liquid, obliterating the engraved markings, and transfers the liquid to the print head roller. The print head roller is patterned in the shape of the final product capacitors. That pattern is transferred to the surface of the main drum.

3b. Vapor Evaporation and Liquid Transfer Masking System

Vapor evaporation and liquid transfer, employing a suitable liquid, such as an oil, may be used to mask areas against deposition of metal. The liquid is contained in an enclosed chamber (not shown) provided with a heater (not shown) for vaporizing the liquid and with a cooling jacket (not shown) for condensing and recirculating excess vapor. The liquid is heated by the heater to create the vapor. The vapor is picked up by a first roller (not shown), where it condenses to form a thin film (not shown). The thin film is then transferred to the main drum 36 by a transfer roller (not shown). The first roller is partially contained in the enclosed chamber, with suitable sealing (not shown) to prevent escape of the vapor, while allowing transfer of the liquid to the transfer roller.

The temperature of the heated liquid must not be so high as to create excess pressure, which would cause the vapor to leak out of the chamber. This approach utilizes the same oil materials as the direct oil printing method. The major advantage of the vapor to liquid method is that it allows a thinner layer of oil to be transferred to the printing roller, with much better control of the oil thickness.

3c. Vapor Jetting

A stationary, enclosed chamber (not shown) contains a suitable liquid. The chamber is provided with heating means (not shown), which vaporizes the liquid. The chamber is also provided with an output port (not shown). A rotating mask (not shown), which rotates around the outside of the chamber, is also provided with an opening. When the opening of the rotating mask lines up with the output port of the chamber during rotation, a quantity of vapor is emitted by the pressure of the vapor within the chamber and deposited on the rotating drum 36. As above, patterned use of a suitable liquid prevents deposition of aluminum in undesired locations. The oil materials that are compatible with this method are low vapor pressure oils (less than $10^{-5}$ Torr) such as those used in diffusion and turbo vacuum pumps.

INDUSTRIAL APPLICABILITY

The high energy density capacitors are expected to find a number of uses as thin film metallized capacitors.

Thus, there has been disclosed a high energy density capacitor and method of fabrication thereof. It will be readily apparent to those skilled in this art that various changes and modifications of an obvious nature may be made, and all such changes and modifications are considered to fall within the scope of the present invention, as defined by the appended claims.

What is claimed is:

1. A high energy density multilayer capacitor having an energy density of at least about 0.5 J/cm$^3$, said capacitor comprising a plurality of interleaved, vacuum-deposited metal electrode layers, each layer separated by vacuum-deposited, radiation-cured polymer dielectric layers, thereby defining an active capacitor region, said interleaved metal electrode layers terminating at opposite ends in a multilayer sputtered, solder-coated termination strip, said metal electrode layers recessed into said polymer dielectric layers along edges orthogonal to said opposite ends, thus creating a non-conducting region, to protect against arcing and leakage current between said metal electrode layers along said orthogonal edges.

2. The high energy density capacitor of claim 1 wherein said non-conducting region between said polymer dielectric layers comprises a non-conducting oxide of said metal electrode layers.

3. The high energy density capacitor of claim 1 wherein each said polymer dielectric layer between said metal electrodes has a thickness that is less than about 10 μm.

4. The high energy density capacitor of claim 3 wherein said thickness ranges from about 0.05 μm to about 2.0 μm.

5. The high energy density capacitor of claim 1 wherein each said polymer dielectric layer comprises a polymer having a dielectric constant κ greater than about 3.

6. The high energy density capacitor of claim 5 wherein said polymer has a dielectric constant κ from about 3.5 to 15.

7. The high energy density capacitor of claim 6 wherein said polymer consists essentially of a radiation-cured polyfunctional acrylate.

8. The high energy density capacitor of claim 1 wherein said metal electrodes comprise a high conductivity, low melting point electrode material that allows said capacitor to self-heal when a breakdown occurs in any said polymer dielectric layer.

9. The high energy density capacitor of claim 8 wherein said metal electrodes are selected from the group consisting of aluminum, zinc, and zinc/aluminum alloys.

10. The high energy density capacitor of claim 9 wherein said metal electrode layers consist essentially of aluminum and have a thickness within the range of 30 to 200 Å.

11. The high energy density capacitor of claim 1 wherein said metal electrode has a resistance in the range of about 1 to 500 ohms per square.

12. The high energy density capacitor of claim 11 wherein said resistance is about 1 ohm per square near said termination strip to allow for good electrical contact and low contact resistance and is in the range of about 10 to 500 ohm per square away from said termination strip and in said active capacitor region to facilitate self-healing if a breakdown occurs in any said polymer dielectric layer.

* * * * *